(12) United States Patent
Jayaraman et al.

(10) Patent No.: US 11,833,374 B2
(45) Date of Patent: Dec. 5, 2023

(54) RESPIRATORY PROTECTION DEVICE

(71) Applicant: Georgia Tech Research Corporation, Atlanta, GA (US)

(72) Inventors: Sundaresan Jayaraman, Atlanta, GA (US); Sungmee Park, Decatur, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 149 days.

(21) Appl. No.: 16/870,047

(22) Filed: May 8, 2020

(65) Prior Publication Data

US 2020/0261750 A1   Aug. 20, 2020

Related U.S. Application Data

(63) Continuation of application No. 14/734,630, filed on Jun. 9, 2015, now Pat. No. 10,646,731.
(Continued)

(51) Int. Cl.
*A62B 23/02* (2006.01)
*A62B 7/10* (2006.01)
(Continued)

(52) U.S. Cl.
CPC ............ *A62B 23/025* (2013.01); *A41D 13/11* (2013.01); *A41D 13/1107* (2013.01);
(Continued)

(58) Field of Classification Search
CPC ....... A62B 23/00; A62B 23/02; A62B 23/025; A62B 7/10; A62B 9/00; A62B 9/04;
(Continued)

(56) References Cited

U.S. PATENT DOCUMENTS

| 314,485 A | * | 3/1885 | Spencer |
| 2,578,007 A | * | 12/1951 | Hill ........................ A41D 13/11 |
| | | | 55/DIG. 35 |

(Continued)

OTHER PUBLICATIONS

Technical Specification Sheet for a 3M particulate respirator comprised of N95 filter media describing that the filter is a polypropylene material, 2018, 6 pages.
(Continued)

*Primary Examiner* — Colin W Stuart
(74) *Attorney, Agent, or Firm* — Meunier Carlin & Curfman LLC (57) ABSTRACT

Respiratory protection systems are provided containing a form-fitting facial frame and a removable filter media. The respiratory protection systems can alleviate the problems with fit and comfort of traditional respiratory protection systems. The form-fitting facial frame can intimately contact the face of a subject and can be configured to removably secure a filter media. The form-fitting facial frame can include an upper frame portion configured to intimately contact the dorsum nasi and cheekbone of a subject, and lower frame portion configured to intimately contact the jaw line of the subject. In some embodiments, the form-fitting facial frame is manufactured based upon a facial feature of a subject. The form-fitting facial frame can be manufactured by 3D printing. The respiratory system can be used with common mechanical filter media including N95 and N100 filter media.

18 Claims, 4 Drawing Sheets

Related U.S. Application Data (60) Provisional application No. 62/009,408, filed on Jun. 9, 2014.

(51) Int. Cl.

| | | |
|---|---|---|
| *A62B 18/08* | (2006.01) | |
| *A62B 18/02* | (2006.01) | |
| *A41D 13/11* | (2006.01) | |
| *A62B 9/04* | (2006.01) | |
| *A62B 9/00* | (2006.01) | |
| *A62B 18/00* | (2006.01) | |
| *A62B 23/00* | (2006.01) | |

(52) U.S. Cl.
CPC ............ *A41D 13/1161* (2013.01); *A62B 7/10* (2013.01); *A62B 9/00* (2013.01); *A62B 9/04* (2013.01); *A62B 18/00* (2013.01); *A62B 18/02* (2013.01); *A62B 18/025* (2013.01); *A62B 18/084* (2013.01); *A62B 23/00* (2013.01); *A62B 23/02* (2013.01)

(58) Field of Classification Search
CPC ....... A62B 18/00; A62B 18/02; A62B 18/025; A62B 18/084; A41D 13/11; A41D 13/1107; A41D 13/1115; A41D 13/1138; A41D 13/1146; A41D 13/1161; A41D 13/1176; A41D 13/1169; A41D 13/1184; A41D 13/1123; A41D 13/113; A41D 13/1192; A41D 13/1153; A61M 16/00; A61M 16/06; A61M 16/047; A61M 2016/0661
See application file for complete search history.

(56) References Cited

U.S. PATENT DOCUMENTS

| | | | | |
|---|---|---|---|---|
| 3,216,415 A | * | 11/1965 | Littleton | ................ A41D 13/11 |
| | | | | 128/206.17 |
| 3,521,630 A | * | 7/1970 | Westberg | ............. A62B 23/025 |
| | | | | 55/528 |
| 3,861,381 A | * | 1/1975 | Witman | ............... A62B 23/025 |
| | | | | 128/206.12 |
| 4,630,604 A | | 12/1986 | Montesi | |
| 10,434,341 B1 | * | 10/2019 | Torbenson | ............... A62B 7/10 |
| 2003/0226563 A1 | | 12/2003 | Brunell | |
| 2004/0000313 A1 | | 1/2004 | Gaynor | |
| 2005/0103344 A1 | * | 5/2005 | Cheng | ................ A41D 13/1161 |
| | | | | 128/206.13 |
| 2007/0106356 A1 | * | 5/2007 | Carstens | ............... A41D 13/005 |
| | | | | 607/114 |
| 2008/0006273 A1 | | 1/2008 | Thornton | |
| 2008/0023006 A1 | | 1/2008 | Kalatoor | |
| 2008/0223370 A1 | * | 9/2008 | Kim | ...................... A62B 23/02 |
| | | | | 128/206.17 |
| 2009/0145444 A1 | | 6/2009 | Edwards | |
| 2009/0277451 A1 | | 11/2009 | Weinberg | |
| 2011/0247626 A1 | | 10/2011 | Chuang | |
| 2012/0080035 A1 | | 4/2012 | Guney | |
| 2012/0180800 A1 | * | 7/2012 | Shibata | ............... A41D 13/1192 |
| | | | | 128/863 |
| 2012/0247474 A1 | * | 10/2012 | Torbenson | ............. A62B 18/10 |
| | | | | 128/206.15 |
| 2014/0261430 A1 | | 9/2014 | Davis | |
| 2014/0283841 A1 | | 9/2014 | Chodkowski | |
| 2015/0047642 A1 | * | 2/2015 | Tucker | .................... A62B 23/02 |
| | | | | 128/206.17 |
| 2015/0216241 A1 | | 8/2015 | Lee | |
| 2016/0129287 A1 | * | 5/2016 | Danford | ............... A62B 23/025 |
| | | | | 128/863 |
| 2016/0199676 A1 | * | 7/2016 | Walker | ............... A41D 13/1146 |
| | | | | 128/205.27 |

OTHER PUBLICATIONS

Product information for "N95 Mask Material" describing the material as "melt blown nonwoven fabric" comprised of "100% polypropylene", 2019, 6 pages.

* cited by examiner

RESPIRATORY PROTECTION DEVICE

CROSS-REFERENCE TO RELATED APPLICATIONS

This application is a Continuation of U.S. patent application Ser. No. 14/734,630, filed Jun. 9, 2015, now U.S. Pat. No. 10,646,731, issuing May 12, 2020, which claims the benefit of and priority to U.S. Provisional Patent Application No. 62/009,408 entitled "A Novel Method for Respiratory Protection" filed on Jun. 9, 2014, which is expressly incorporated by reference as if fully set forth herein in its entirety.

TECHNICAL FIELD

The present disclosure generally relates to respiratory protection devices including filter media.

BACKGROUND

Protection of healthcare workers in the event of an influenza pandemic is a national imperative and personal protective equipment (PPI) is at the frontline of defense. Specifically, medical masks are designed to protect both the patient and the healthcare workers from "transfer of microorganisms, body fluids, and particulate material." However, their successful deployment in the field and acceptance by healthcare workers depends on several factors including efficacy, comfort, usability, wearability, shape-conformance (fit) and durability. Additionally, the reusability of the masks will increase the availability of such masks in the event of a pandemic and have a positive impact on the environment by minimizing the number of disposable masks being discarded after a single use.

The current generation of respirators/masks is made from non-woven materials and is intended for single use. Moreover, they are not comfortable for the wearer. Therefore, there is a need for a device that overcomes the aforementioned shortcomings and is also reusable.

It is an object of this disclosure to provide improved respiration and ventilation masks that provide an improved fit and improved seal to a variety of facial features.

It is also an object of this disclosure to provide improved respiration and ventilation masks that are more comfortable to wear for an extended period of time.

It is further an object of this disclosure to provide improved respiration and ventilation masks that are reusable in whole or in part.

It is additionally an object of this disclosure to provide improved respiration and ventilation masks that can be tailored to fit specific facial features.

An object of this disclosure is further to provide methods of making and methods of using improved respiration and ventilation masks provided herein.

SUMMARY

We disclose herein a respiratory protection system and device to address the aforementioned deficiencies. In various aspects, our respiratory protection device can be a filtration mask that is comfortable, reusable and obviates fit-testing. It can be produced using a combination of material types, fabric structures (single, multilayer, and their inherent variations), and manufacturing technologies (weaving, knitting and fabric finishing, and combinations thereof) and a combination of woven/knitted structures with nonwoven filters integrated into "pockets" within the multilayer structure.

The mask can have a peripheral stretch material boundary or frame (for example, a polyurethane-based structure, e.g., an elastomeric polymer-based composition) that can ensure proper fit of the mask on the user and consequently, minimize face seal leakage and maintain the filtration performance of the device.

A form-fitting facial frame for use in a respiratory protection system is provided. The form-fitting facial frame can be configured from two or more pieces or, in some embodiments, can be configured from a single piece. The form-fitting facial frame can include an upper frame portion configured to intimately contact the dorsum nasi and cheekbone of a subject. The form-fitting facial frame can include a lower frame portion configured to intimately contact the jaw line of the subject. In some embodiments, a form-fitting facial frame is provided as a single piece having both the upper frame portion and the lower frame portion. The form-fitting facial frame can be configured to removably secure a removable filter media.

The form-fitting facial frame can have a first strap configured to extend from at least two ends of the upper frame portion and over the head of the subject. The form-fitting facial frame can have a second strap configured to extend from at least two ends of the upper frame portion behind the neck of the subject. The upper frame portion and the lower frame portion can form the boundaries of a strap configured to pass over the ears and be secured at the rear of the neck of the subject. The strap can have ear holes configured to receive the ears of the subject. The form-fitting facial frame can have a flexible member bridging a left side of the lower frame portion and a right side of the lower frame portion.

All or a part of the form-fitting facial frame can be manufactured from an elastomeric material. The form-fitting facial frame can also include a seal or gasket attached to the interior of the form-fitting facial frame. Suitable elastomeric polymer materials include, but are not limited to, thermoplastic elastomers, styrenic materials, olefenic materials, polyolefin, polyurethane thermoplastic elastomers, polyamides, synthetic rubbers, PDMS, polybutadiene, polyisobutylene, poly(styrene-butadiene-styrene), polyurethanes, polychloroprene and silicones.

A removable filter media can be configured to removably attach to the form-fitting facial frame. For example the form-fitting facial frame can include a pocket, button, or tab to removably secure the removable filter media. The removable filter media can have one or more tabs configured to be secured in the form-fitting facial frame. The filter media can be N95, N99, N100, R95, R99, R100, P95, P99, and P100 mechanical filter materials.

Methods of making the respiratory protection systems and form-fitting facial frames are provided. The methods can include measuring one or more facial features, for example by scanning a subject to measure one or more facial features, optionally transmitting the features (wirelessly, over a network, or over the internet) to a different location, and manufacturing an upper frame portion, a lower frame portion, or both based upon the one or more facial features. The upper frame portion can be manufactured to intimately contact the dorsum nasi and cheekbone of the subject. The lower frame portion can be manufactured to intimately contact the jaw line of the subject. The upper frame portion and lower frame portion can be manufactured as a single piece or, optionally, can be manufactured separately and then joined to form a single piece. The upper frame portion, the lower frame portion, or both can be manufactured from 3D or additive printing.

Other systems, methods, features, and advantages of the present disclosure for a respiratory protection device, will be or become apparent to one with skill in the art upon examination of the following drawings and detailed description. It is intended that all such additional systems, methods, features, and advantages be included within this description, be within the scope of the present disclosure, and be protected by the accompanying claims. For instance, the frame can be made by knitting or weaving Spandex fibers (to provide the form-fitting features) with regular textile fibers (e.g., Nylon).

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A-3D depict several views of a subject wearing one embodiment of a respiratory protection systems.

DETAILED DESCRIPTION

Described below are various embodiments of a respiratory protection system. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

DISCUSSION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for.

It is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

We provide a more comfortable and better fitting respiratory protection system. The respiratory protection system can include a form-fitting facial frame and a filter media. In any one or more aspects, it can include a peripheral boundary or frame. The peripheral boundary or form-fitting facial frame can, for example, be made of an elastomeric polymer boundary that will ensure proper fit of the mask on the user and consequently, minimize face seal leakage and maintain the filtration performance of the device. Suitable elastomeric polymer materials include, but are not limited to, thermoplastic elastomers, styrenic materials, olefenic materials, polyolefin, polyurethane thermoplastic elastomers, polyamides, synthetic rubbers, PDMS, polybutadiene, polyisobutylene, poly(styrene-butadiene-styrene), polyurethanes, polychloroprene and silicones.

The peripheral or elastomeric boundary material, hereinafter referred to as the facemask or respirator frame, can encompass a structure realized through 3-D printing technologies. It does not have to stretch in the traditional sense of a stretchable knitted or woven fabric, such as made from Spandex®, but yet be comfortable and fit the user facial profile.

Thus, a reusable respiratory protection device is provided that can be customized to an individual user facial profile, obviate the need for fit-testing, and provide the desired level of respiratory protection (e.g., regular surgical mask, N95, N100, P100, etc.) to the user. It presents a new approach to realizing the facemask frame through 3-D printing technology.

The device can include a facemask frame that can have the ability to lock in and hold the filter media (produced using, for example N95, N100 or other filter media) to provide the desired degree of respiratory protection. After the device has been used, the filter media can be removed from the facemask frame and disposed off (using appropriate methods for handling contaminated materials). The facemask frame can then be disinfected and reused. Thus, the facemask frame can be configured to easily put on, effectively hold, and subsequently take off the filter media.

The respiratory protection system can include a form-fitting facial frame. The form-fitting facial frame can be made from a variety of materials and structures configured to make intimate contact and seal with a portion of the face of a subject wearing the respiratory protection system. The form-fitting facial frame can be configured from two or more pieces or, in some embodiments, can be configured from a single piece. For example, the form-fitting facial frame can have an upper frame portion configured to intimately contact the dorsum nasi and cheekbone of a subject. The form-fitting facial frame can have a lower frame portion configured to intimately contact the jaw line of the subject. In some embodiments, a form-fitting facial frame is provided as a single piece having both the upper frame portion and the lower frame portion. The form-fitting facial frame can be configured to removably secure a removable filter media. A variety of removable filter media can be used.

The form-fitting facial frame can be secured by one or more straps or other fastening means. In some embodiments, one or more straps is attached to the upper frame portion, the lower frame portion, or both and configured to secure the form-fitting facial frame to the face of the subject. The form-fitting facial frame can have a strap configured to extend from at least two ends of the upper frame portion and over the head of the subject. The form-fitting facial frame can have a strap configured to extend from at least two ends of the upper frame portion behind the neck of the subject. The upper frame portion and the lower frame portion can form the boundaries of a strap configured to pass over the ears and be secured at the rear of the neck of the subject. The strap can have ear holes configured to receive the ears of the subject.

The form-fitting facial frame can include additional straps or other flexible members to ensure a tight seal and a comfortable fit to the face of the subject. For example, the form-fitting facial frame can have a flexible member bridging a left side of the lower frame portion and a right side of the lower frame portion. The flexible member can be configured to intimately contact below the jaw of the subject.

All or part of the form-fitting facial frame can be manufactured from an elastomeric material. The flexible members and/or the straps can be manufactured with elastomeric materials. In some embodiments the upper frame portion, the lower frame portion, or both are made from an elastomeric material. In some embodiments, the form-fitting facial frame includes one or more seals or gaskets that are attached to the interior of the form-fitting facial frame, for example to the upper frame portion or the lower frame portion. Suitable elastomeric polymer materials include, but are not limited to, thermoplastic elastomers, styrenic materials, olefenic materials, polyolefin, polyurethane thermoplastic elastomers, polyamides, synthetic rubbers, PDMS, polybutadiene, polyisobutylene, poly(styrene-butadiene-styrene), polyurethanes, polychloroprene and silicones.

The form-fitting facial frame can be configured to removably secure a removable filter media. The removable filter media can be manufactured using a variety of filter materials. For example, the filter material can be, but not limited to, N95, N99, N100, R95, R99, R100, P95, P99, or P100 mechanical filter material. The removable filter media can be secured using a pocket, a button, a tab, or a combination thereof in the form-fitting facial frame. The removable filter media can further have a button or a tab allowing it to be secured in the form-fitting facial frame.

The form-fitting facial frame and removable filter media can be manufactured by many methods known to those skilled in the relevant arts. In some embodiments the methods include scanning or measuring one or more facial features of the subject. The methods can include manufacturing an upper frame portion, a lower frame portion, or both based upon the one or more facial features. The upper frame portion can be manufactured to intimately contact the dorsum nasi and cheekbone of the subject. The lower frame portion can be manufactured to intimately contact the jaw line of the subject. In some embodiments the upper frame portion, the lower frame portion, or both are manufactured using a 3D or additive printing system. The user face can be scanned to create the profile and structure of the face mask frame. Suitable 3D printers can include the Object Connex printer available from Stratasys. The facemask frame can be produced using 3-D printing technologies and polymeric materials that can provide effective sealing around the face to reduce or prevent any face seal leakage, conform to the user facial profile, be comfortable and withstand cleaning and decontamination for reuse. In some embodiments the form-fitting facial frame can withstand the common means of destroying microorganisms. In healthcare applications, the common means of destroying microorganisms is hot-water washing at a temperature of at least 160° F. (71° C.) for a minimum of 25 minutes (Garner J S, Favero M S. Guideline for hand washing and hospital environmental control. Atlanta, GA: U.S. Department of Health and Human Services, Public Health Service, Centers for Disease Control, 1985. Document No. 99a117). Such high levels of processing conditions may not be necessary for other industrial applications, e.g., dust protection. The respiratory protection system can be used and, after use, the removable filter media can be removed and discarded. The form-fitting facial frame can be cleaned and/or sanitized, a new filter media can be removably inserted into the frame, and the system can be reused by a subject.

As will be apparent to those of skill in the art upon reading this disclosure, each of the individual embodiments described and illustrated has discrete components and features which may be readily separated from or combined with the features of any of the other several embodiments without departing from the scope or spirit of the present disclosure. Any recited method can be carried out in the order of events recited or in any other order logically possible.

Figure 1:
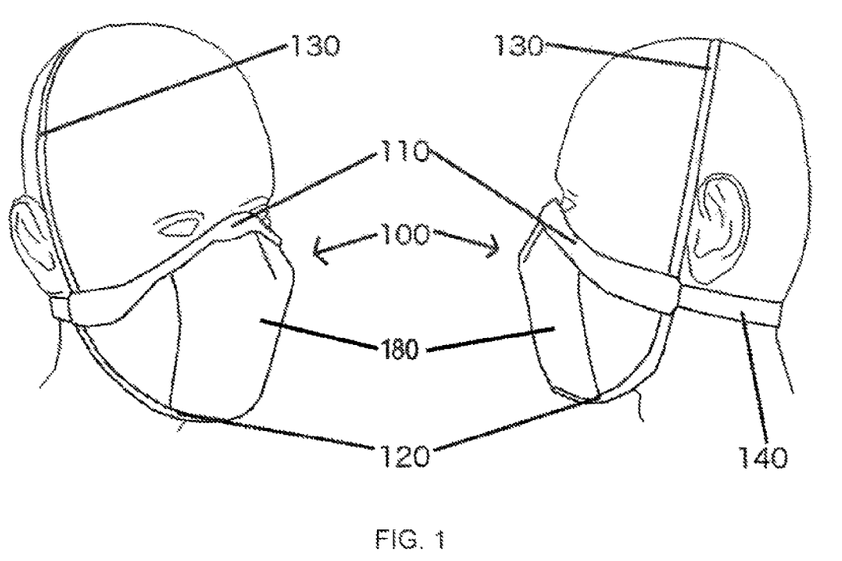
FIG. 1 depicts front and side views of one embodiment of a respiratory protection system having a form-fitting facial frame and a removable filter media.
Figure 2:
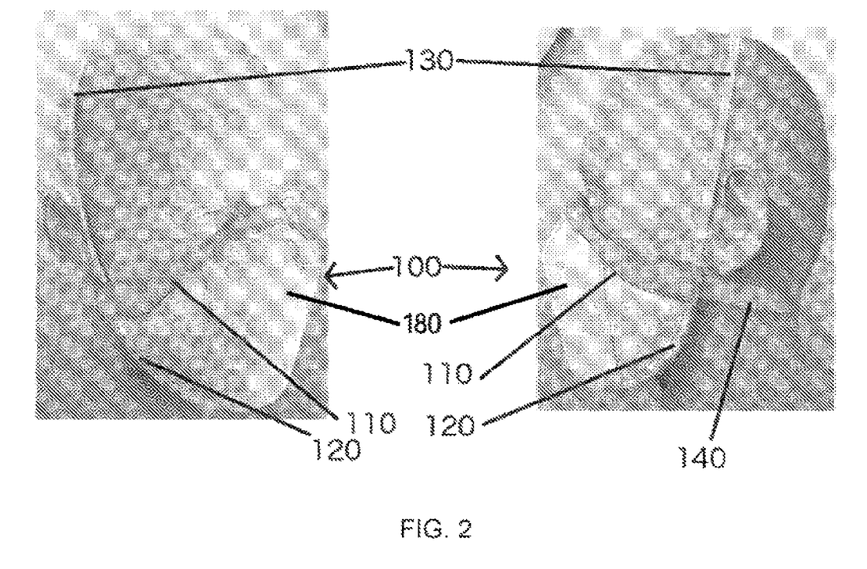
FIG. 2 is a photograph showing front and side views of the exemplary respiratory protection system having a form-fitting facial frame and a removable filter media.

FIG. 1 depicts a front and side view of one exemplary embodiment of a respiratory protection system having a form-fitting facial frame 100 having an upper frame portion 110 and a lower frame portion 120 and removable filter media 180. FIG. 2 is a photo of the respiratory protection system from FIG. 1. The upper frame portion 110 can be configured to intimately contact the dorsum nasi and cheekbone of the subject. The lower frame portion 120 can be configured to intimately contact the jaw line of the subject. The form-fitting facial frame 100 can have a first strap 130 extending from at least two ends of the upper frame portion 110 and over the head of the subject. The form-fitting facial frame 100 can have a second strap 140 extending from at least two ends of the upper frame portion 110 and behind the neck of the subject.

Figure 3A:
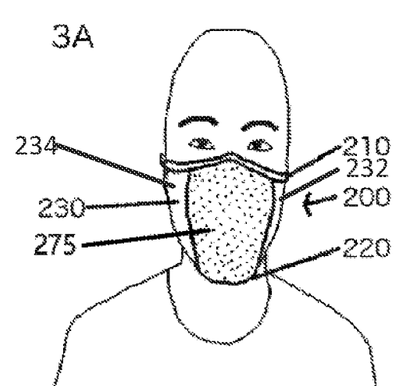
FIG. 3A depicts a front view of the subject wearing the respiratory protection system.
Figure 3B:
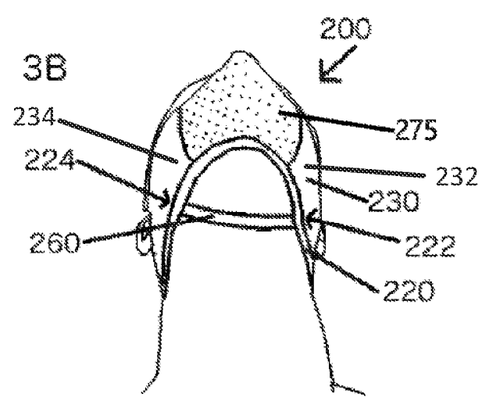
FIG. 3B depicts a front view from below the jaw line of the subject wearing the respiratory protection system.
Figure 3C:
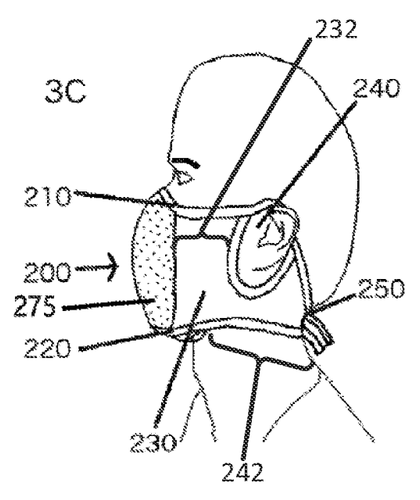
FIG. 3C depicts a side view of the subject wearing the respiratory protection system.
Figure 3D:
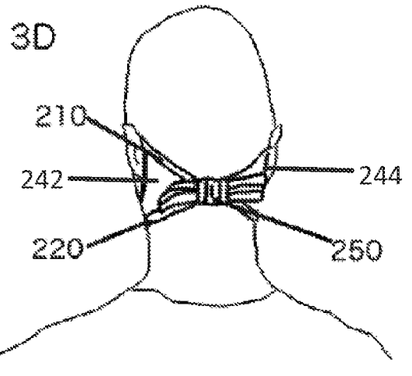
FIG. 3D depicts a rear view of the subject wearing the respiratory protection system.
Figure 4:
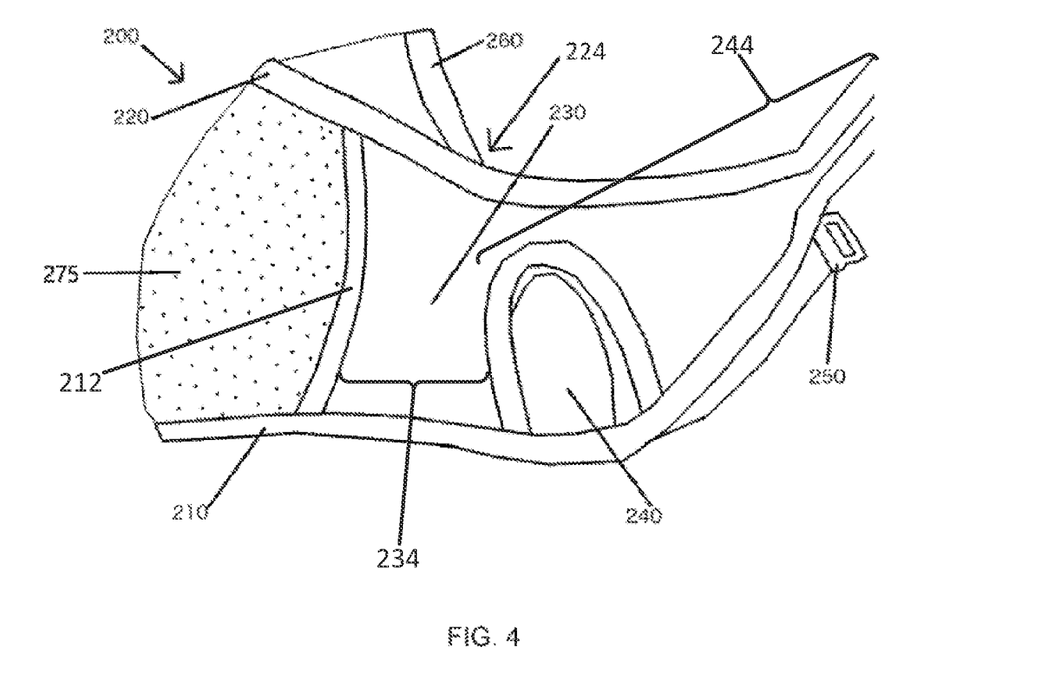
FIG. 4 depicts a folded view of one embodiment of a form-fitting facial frame for a respiratory protection system.

FIGS. 3A-3B depict various views of one embodiment of a respiratory protection system on a subject. FIG. 3A is a front view of the subject wearing the respiratory protection system having a form-fitting facial frame 200 and removable filter media 275. FIG. 3B is a front view from below the jaw line of the subject wearing the respiratory protection system having a form-fitting facial frame 200. FIG. 3C is a side view of the subject wearing the respiratory protection system having a form-fitting facial frame 200. FIG. 3D is a rear view of the subject wearing the respiratory protection system having a form-fitting facial frame 200. FIG. 4 is a folded view of the form-fitting facial frame 200.

The form-fitting facial frame 200 can have an upper frame portion 210 configured to intimately contact the dorsum nasi and cheekbone of the subject. The form-fitting facial frame can also have a lower frame portion 220 configured to intimately contact the jaw line of the subject. The upper frame portion 210, lower frame portion 220, and associated left and right side frame portions 212 can form the boundaries of a strap 230 having a left side panel member 232 and a right side panel member 234 (the panel members shown at the end of the reference number line 230 in FIGS. 3A-3C and FIG. 4, among others), where the strap 230 is configured, as a left and right side connection members 242, 244, to pass over the ears and be secured at the rear of the neck of the subject. The strap 230 can be made from a form-fitting material such as elastomeric polymers or by knitting or weaving Spandex fibers (to provide the form-fitting features) with regular textile fibers (e.g., Nylon). The strap 230 can have a pair of ear holes 240 configured to receive the ears of the subject. The strap 230, including the left and right side connection members 242, 244 and the left side and right side panel members 232, 234, can be secured by a fastening means 250.

Figure 5:
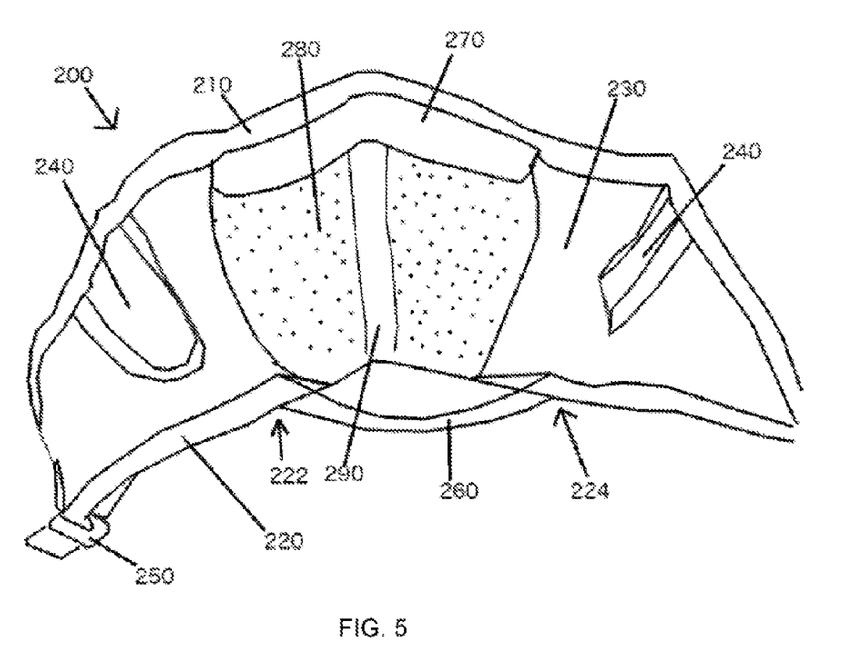
FIG. 5 depicts an inside view of the form-fitting facial frame of a respiratory protection system.
Figure 6:
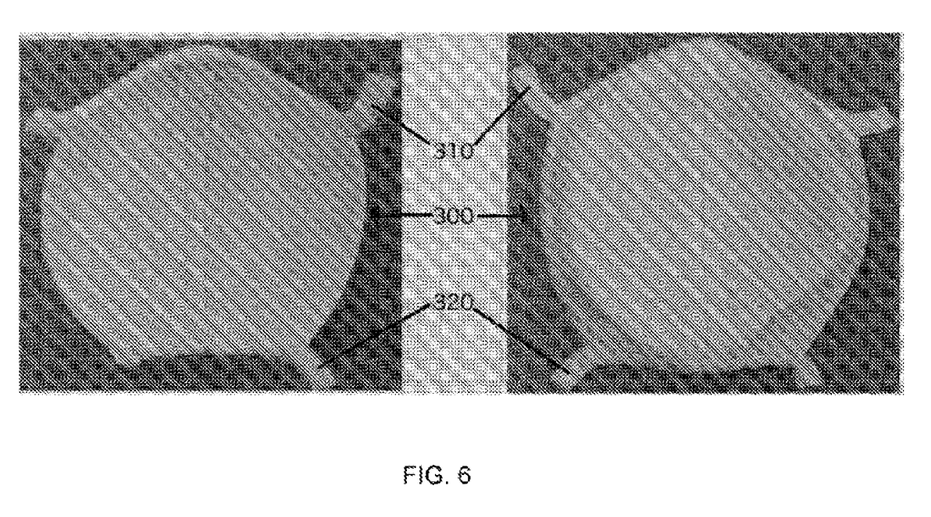
FIG. 6 depict a back (left) and front (right) view of one embodiment of a removable filtration media for use in a respiratory protection system.

As shown in FIG. 5, in some embodiments the strap 230 can have a flexible member 260 bridging a side 222 of the lower frame portion extending over a left side of the face of the subject and a side 224 of the lower frame portion extending over a right side of the face of one subject. In some embodiments the form-fitting facial frame 200 can contain a interfacial seal 270 attached to the upper frame portion 210 and configured to form an intimate seal between the upper frame portion 210 and the subject. In some embodiments the form-fitting facial frame also contains a pocket 280 to removably secure a removable filter media (not pictured). For example, the pocket 280 can be accessible through a slit 290 to allow placement or removal of a removable filter media. Other means of securing the filter media in the form-fitting facial frame are also envisioned. For example, the form-fitting facial frame can include one or more interlocking pieces that secure the filter media at the peripheral edge(s) of the filter media. The form-fitting facial frame and filter media can have interlocking structures such as interlocking pegs and holes designed to removably secure the filter media in the form-fitting facial frame. FIG. 6 shows an embodiment of the removable filter media 300 with upper tabs 310 and lower tabs 320.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

We claim:

1. A respiratory protection system comprising:
   1) A form-fitting facial frame including:
      a) an upper frame portion configured to contact and extend over the dorsum nasi and left and right cheekbones of a subject;
      b) a lower frame portion spaced apart from the upper frame portion, the lower frame portion configured to contact and extend underneath a chin of the subject and along a right portion and a left portion of the chin of the subject;
      c) opposed and spaced apart left side and right side panel members, the left side panel member extending from a left side of the upper frame portion to a left side of the lower frame portion, and the right side panel member extending from a right side of the upper frame portion to a right side of the lower frame portion, wherein the left side panel member and the right side panel member are separately formed from the upper frame portion and lower frame portion, wherein the upper and lower frame portions and the left side and right side panel members form a space therebetween for receiving a filter media, or for securing a material configured to receive a filter media, wherein in use, the filter media is configured to lie over and be superior to a nose and mouth of the subject; and
   2) a left side connection member extending from the left side panel member away from the space formed by the upper and lower frame portions and the left side and right side panel members, and a right side connection member extending from the right side panel member away from the space formed by the upper and lower frame portions and the left side and right side panel members, the left side connection member and the right side connection member comprising an elastic or stretchable material having an ear hole to permit an ear of the subject to pass through the ear hole to allow the left side connection member and the right side connection member to be place-ably secured in a form fit manner to each other behind a neck of the subject, wherein widths extending between respective upper and lower edges of the upper and lower frame portions are each less than widths extending between respective forward edges and connection members of the left and right side panel members.

2. The respiratory protection system of claim 1, wherein a filter media is removably secured to the upper and lower frame portions and the left side and right side panel members.

3. The respiratory protection system of claim 1, further comprising a flexible member bridging a left side of the lower frame portion and a right side of the lower frame portion, the flexible member configured to pass underneath the chin of the subject.

4. The respiratory protection system of claim 3, wherein the flexible member comprises an elastomeric material.

5. The respiratory protection system of claim 1, wherein the upper frame portion, the lower frame portion, or both comprise an elastomeric material.

6. The respiratory protection system of claim 1, further comprising a seal attached to an inside of the upper frame portion.

7. The respiratory protection system of claim 1, wherein the filter media comprises a material selected from the group consisting of N95, N99, N100, R95, R99, R100, P95, P99, and P100 mechanical filters.

8. The respiratory protection system of claim 1, wherein the left side panel member has a forward edge that defines in part the space and contacts a left side frame portion extending along the forward edge of the left side panel member from a left side of the upper frame portion to a left side of the lower frame portion and the right side panel member has a forward edge that defines in part the space and contacts a right side frame portion extending along the forward edge of the right side panel member from a right side of the upper frame portion to a right side of the lower frame portion, wherein the left side frame portion is separately formed from the left side panel member, and wherein the right side frame portion is separately formed from the right side panel member.

9. The respiratory protection system of claim 8, wherein the facial frame is a single piece comprising the upper frame portion, the lower frame portion, the left side frame portion and the right side frame portion.

10. The respiratory protection system of claim 1, wherein the material configured to receive a filter media includes a pocket formed within the material for receiving a filter media.

11. A respiratory protection system comprising:
1) A form-fitting facial frame including:
   a) an upper frame portion configured to contact and extend over the dorsum nasi and left and right cheekbones of a subject;
   b) a lower frame portion spaced apart from the upper frame portion, the lower frame portion configured to contact and extend underneath a chin of the subject and along a right portion and a left portion of the chin of the subject;
   c) opposed and spaced apart left side and right side panel members, the left side panel member extending from a left side of the upper frame portion to a left side of the lower frame portion, and the right side panel member extending from a right side of the upper frame portion to a right side of the lower frame portion, wherein the left side panel member and the right side panel member are separately formed from the upper frame portion and lower frame portion, wherein the upper and lower frame portions and the left side and right side panel members form a space therebetween for receiving a filter media, wherein in use, the filter media is configured to lie over and be superior to a nose and mouth of the subject;
2) A pocket within the space formed by the upper and lower frame portions and the left side and right side panel members and secured directly or indirectly to the upper and lower frame portions and the left side and right side panel members, the pocket configured to receive a removable filter media; and
3) a left side connection member extending from the left side panel member away from the space, and a right side connection member extending from the right side panel member away from the space, the left side connection member and the right side connection member comprising an elastic or stretchable material having an ear hole to permit an ear of the subject to pass through the ear hole to allow the left side connection member and the right side connection member to be place-ably secured in a form fit manner to each other behind a neck of the subject, wherein widths extending between respective upper and lower edges of the upper and lower frame portions are each less than widths extending between respective forward edges and connection members of the left and right side panel members.

12. The respiratory protection system of claim 11, further comprising a flexible member bridging a left side of the lower frame portion and a right side of the lower frame portion, the flexible member configured to pass underneath the chin of the subject.

13. The respiratory protection system of claim 12, wherein the flexible member comprises an elastomeric material.

14. The respiratory protection system of claim 11, wherein the upper frame portion, the lower frame portion, or both comprise an elastomeric material.

15. The respiratory protection system of claim 11, further comprising a seal attached to an inside of the upper frame portion.

16. The respiratory protection system of claim 11, further including a removable filter media within the pocket, wherein the removable filter media comprises a material selected from the group consisting of N95, N99, N100, R95, R99, R100, P95, P99, and P100 mechanical filters.

17. The respiratory protection system of claim 11, wherein the left side panel member has a forward edge that defines in part the space and contacts a left side frame portion extending along the forward edge of the left side panel member from a left side of the upper frame portion to a left side of the lower frame portion and the right side panel member has a forward edge that defines in part the space and contacts a right side frame portion extending along the forward edge of the right side panel member from a right side of the upper frame portion to a right side of the lower frame portion, wherein the left side frame portion is separately formed from the left side panel member, and wherein the right side frame portion is separately formed from the right side panel member.

18. The respiratory protection system of claim 17, wherein the facial frame is a single piece comprising the upper frame portion, the lower frame portion, the left side frame portion and the right side frame portion.

* * * * *